US010768123B2

(12) United States Patent
Linev et al.

(10) Patent No.: US 10,768,123 B2
(45) Date of Patent: Sep. 8, 2020

(54) X-RAY DEFECTOSCOPE (DEFECT SCANNER) FOR PROTECTIVE CLOTHING

(71) Applicant: ADANI Systems, Inc., Alexandria, VA (US)

(72) Inventors: Vladimir N. Linev, Minsk (BY); Leonid Kourtch, Minsk (BY)

(73) Assignee: Adani Systems, Inc., Alexandria, VA (US)

(*) Notice: Subject to any disclaimer, the term of this patent is extended or adjusted under 35 U.S.C. 154(b) by 161 days.

(21) Appl. No.: 16/117,390

(22) Filed: Aug. 30, 2018

(65) Prior Publication Data

US 2020/0072768 A1 Mar. 5, 2020

(51) Int. Cl.
*G01N 23/18* (2018.01)
*G01N 23/083* (2018.01)

(52) U.S. Cl.
CPC .......... *G01N 23/083* (2013.01); *G01N 23/18* (2013.01)

(58) Field of Classification Search
CPC .... G01N 23/083; G01N 23/18; G01N 23/223; G01B 15/025
See application file for complete search history.

(56) References Cited

U.S. PATENT DOCUMENTS

2013/0070897 A1* 3/2013 Jacotin .................. G01N 23/04
378/62

OTHER PUBLICATIONS

Livingstone et al., Simple quality control tool for assessing integrity of lead equivalent aprons, Indian Journal of Radiology and Imaging, Apr.-Jun. 2018, pp. 258-262 (Year: 2018).*
Baldassarre et al., Real-Time Defect Detection on Cloths, EUROPTO'99, paper #3824-44, pp. 1-12 (Year: 1999).*
Christodoulou et al., Evaluation of the transmitted exposure through lead equivalent aprons used in a radiology department, including the contribution from backscatter, Med. Phys. 30 (6), Jun. 2003 pp. 1033-1038 (Year: 2003).*
Jones et al. (On the (f)utility of measuring the lead equivalence of protective garments, Medical Physics 40(6), Jun. 2013, pp. 063902-1 to 063902-9) (Year: 2013).*

* cited by examiner

*Primary Examiner* — Said M Elnoubi
(74) *Attorney, Agent, or Firm* — Bardmesser Law Group

(57) ABSTRACT

A method of detecting defects in protective clothing items includes positioning a protective clothing item in a scanner; moving the item through scanner while irradiating the item with X-rays; measuring energy of the X-rays that pass through the item using a linear detector as the item is being moved through the scanner; calculating a lead equivalent thickness of each pixel of the item based on the energy; identifying any areas of the item with defects; and displaying an image of the item with the identified areas highlighted. Optionally, a conveyor belt and clamping wheels are used to move the item. Different colors are used to indicate different lead equivalent thickness on the image. Optionally, the method includes dividing the image into separate windows of 10x10 pixels, corresponding to areas of up to 15x15 mm, and calculating arithmetic mean of the lead equivalent thickness for the item and for each area.

11 Claims, 8 Drawing Sheets

X-RAY DEFECTOSCOPE (DEFECT SCANNER) FOR PROTECTIVE CLOTHING

BACKGROUND OF THE INVENTION

Field of the Invention

The present invention is related to scanning X-ray radiation protective clothing for defects.

Description of the Related Art

X-ray protective clothing, such as protective aprons, are essential to reducing the radiation exposure of personnel during X-ray scanning. Frequent use of such protective clothing inevitably results in deteriorated functional properties, particularly in destruction of large areas of protective coating. Currently, slightly modified medical X-ray scanners or a method for determining attenuation properties of X-ray protective materials [1, 2] are often used to monitor the properties of protective clothing. This method measures absorption properties on several smaller areas of about one square decimeter each that collectively cover around 10% or less of the surface of the scanned object, e.g., a protective apron. But such scans are very likely to miss damaged protective areas. If damaged areas are small, they are ~90% likely to be missed, and even at several square decimeters per area, the probability of a miss is considerable. Meanwhile, large areas of damaged protective coating may result in significant radiation exposure during X-ray angiography [3].

At the same time, the method for determining attenuation properties of materials itself [1, 2] suffers from a number of drawbacks. Most of these drawbacks are related to the use of ionization chambers that directly measure the kerma. For instance, when broad beam geometry is used [1, 2], the chamber size has to be 5-10 times smaller than the test object, but not too small, or it won't be able to make quick and reliable measurements. Still, in practice, chambers or various sizes and even shapes are widely used. These drawbacks have necessitated the switch from traditional spherical ionization chambers, or functionally equivalent ones [1], to flat ionization chambers [2, 4, 5]. Nonetheless, this also leaves a number of obstacles related to differences in response time between various chambers in partially cluttered conditions [4, 5]. Additionally, since scanned areas are usually about 50 cm in size [1], in order to provide low angular divergence of incident radiation, as required, the radiation source has to be positioned more than a meter away from the scanned object.

Recently, there has been a discussion about introducing new materials for protective clothing that contain limited amounts of lead or none at all [2, 4, 5]. It is argued [5] that such materials may allow to reduce protective clothing weight by 20%. As such, novel X-ray protective materials contain chemical elements with lower atomic numbers than those of lead, e.g., tin (Sn, Z=50), and they are characterized by higher secondary X-ray flows and buildup factors. Meanwhile, actual buildup factor values are somewhat indefinite, as the chemical compositions of attenuating materials with lower lead contents may vary a lot.

Accordingly, there is a need in the art for better protective clothing defect scanning systems and methods.

SUMMARY OF THE INVENTION

The invention relates to a method and system for defect scanning of protective clothing that substantially obviates one or more of the disadvantages of the related art.

In one aspect, there is provided a method of detecting defects in protective clothing items, the method including positioning a protective clothing item in a scanner; moving the item through scanner while irradiating the item with X-rays; measuring energy of the X-rays that pass through the item using a linear detector as the item is being moved through the scanner; calculating a lead equivalent thickness of each pixel of the item based on the measured energy; identifying any areas of the item with defects; and displaying an image of the item for an operator with the identified areas highlighted.

Optionally, a conveyor belt is used to move the item. Optionally, different colors are used to indicate different lead equivalent thickness on the image. Optionally, the method also includes dividing the image into separate windows of 10×10 pixels, corresponding to areas of up to 15×15 mm. Optionally, the method also includes calculating an arithmetic mean of the lead equivalent thickness for an entire area item and for each areas. Optionally, the method also includes determining an area with the least lead equivalent thickness and identifying the area with the least lead equivalent thickness for the operator.

Optionally, the method also includes determining values of relative heterogeneity of the detection area of the protective clothing item. Different types of protective clothing (e.g., hat, apron, etc.) when being can have an area determined with specific areas and boundaries, and within these boundaries the heterogeneity can be calculated. One item can be subject to multiple scans if needed, to scan its entire surface, and each scan will identify the area(s) where the heterogeneity is calculated/detected. Optionally, the method also includes calculating the following values: lead equivalent attenuation in critical areas; arithmetic mean of the lead equivalent attenuation; relative heterogeneity of the protective material; and deviation of the lead equivalent thickness of the entire item from a nominal value.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The drawbacks of the conventional approach (see [1, 2]) have been largely eliminated in the proposed X-ray defectoscope, an example of which is sold by Adani Systems, Inc. under the brand name ADANI FLOWD 8020 X-ray defectoscope [6], and which generally embodies the concepts described in the present application. The defectoscope includes an X-ray scanner with narrow, flat fan-beam radiation and a dual-energy linear array detector. The defectoscope is capable of scanning large surfaces of objects, observing any minor damages in the entire protective coating, as well as 100% reliably detecting and classifying any larger damages. Together with this obvious advantage, the defectoscope embodies a new high-precision method for determining attenuation properties of materials that has a number of improvements over the conventional method.

Figure 1:
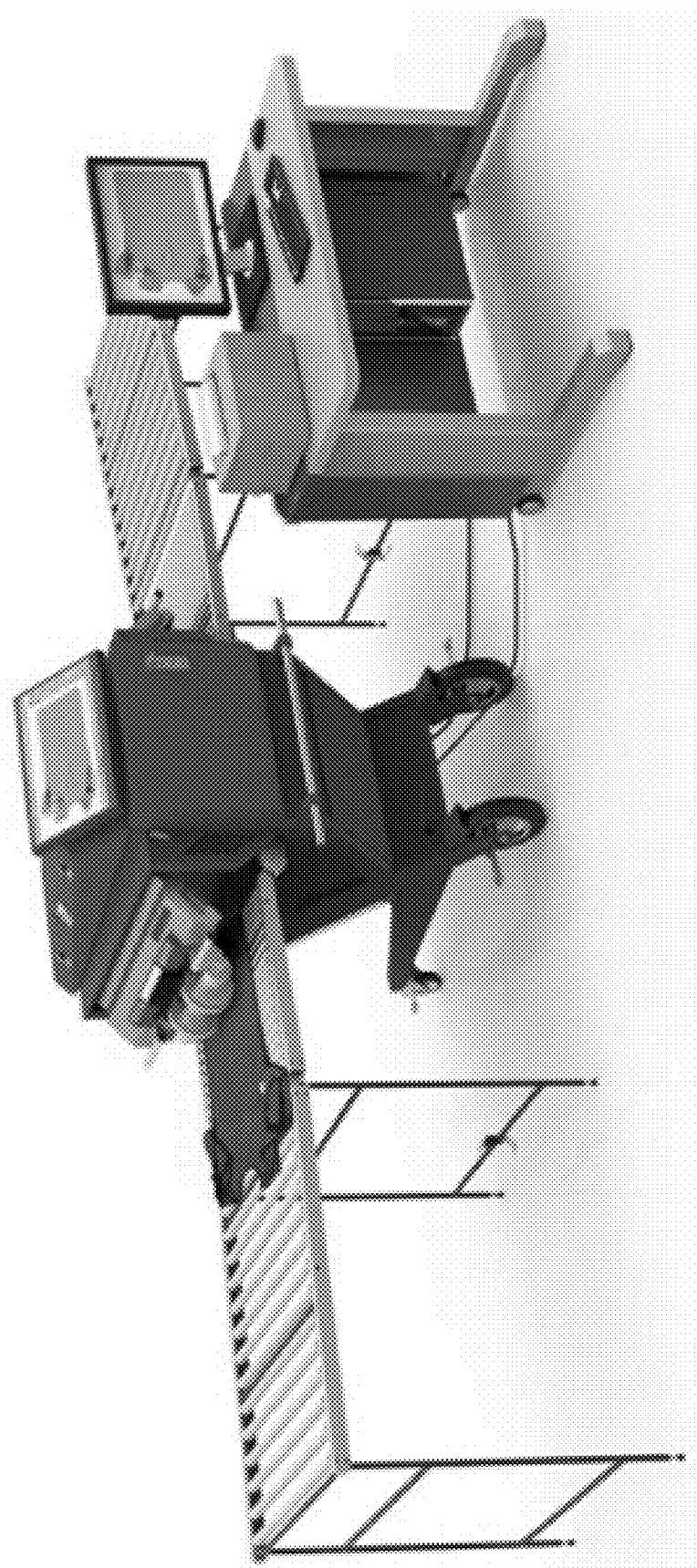
FIG. 1 shows a general view of a deployed defectoscope according to an embodiment of the present invention.

FIG. 1 shows a general view of a deployed defectoscope. The samples of protective clothing or protective materials to be tested are supplied onto the testing chamber conveyor belt via convertible rollers with clamping drums. The structure of the testing chamber fully negates any exposure to both direct and scattered X-ray radiation, providing for safe working conditions and protecting X-ray scanner operators and bystanders from radiation. The operator controls the scanner from an automated workstation with specialized software.

Figure 2:
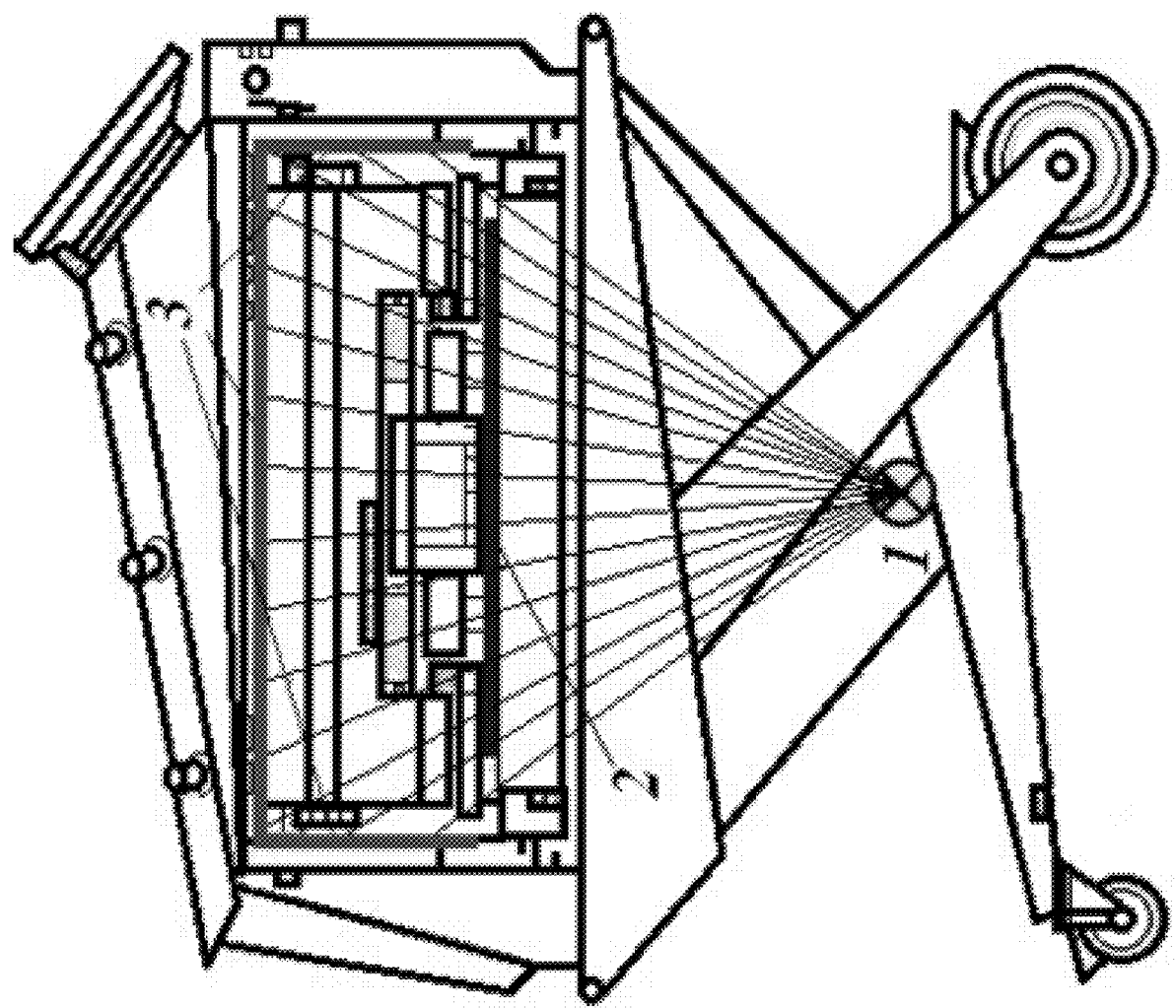
FIG. 2 shows a cross-section of the scanner's testing chamber, illustrating the scanning of a test object using a fan beam.

FIG. 2 shows a cross-section of the scanner's testing chamber, illustrating the scanning of a test object using a fan beam with conical angle of 82°, that is generated with a set of collimators. In FIG. 2, 1 is the X-ray source, 2 is the test object, and 3 is the X-ray dual-energy linear array detector.

The beam is coplanar with the figure and with the position of the dual-energy X-ray receiver. The receiver is a multi-element U-shaped photodiode matrix with two layers of scintillation coating separated by an X-ray filter that allow to register X-rays in both hard and soft parts of the spectrum.

The digital X-ray object projection image is generated through step-by-step precision scanning In pixel detectors, changes in intensity of X-rays passing through the test object are provided by the fact that their photodiode currents are proportionate to total energies of X-ray photons absorbed by scintillation counters in their X-ray-sensitive elements, which determine the number of pixels in the digital image. During the scanning, output signals of each element are read sequentially, digitized, stored and then turned into columns of the digital image. The total number of columns is determined by the number of interrogation cycles of the U-shaped matrix of X-ray-sensitive elements, the number of cycles depending on the conveyor belt speed, test object length and interrogation time of the X-ray receiver. In the course of each cycle, the signals from the receiver elements are read and turned into image columns.

Each array detector sensor is calibrated individually. For this, radiation attenuation coefficients are measured in the two-stage or three-stage calibration wedge with lead stages. These measurements are used to calculate calibration function coefficients that allows to determine lead equivalent thickness of the test object by measuring the intensity of penetrating radiation with each detector pixel. The fundamental improvement of this configuration is that calibration of and the object's lead equivalent thickness measurement by each individual X-ray-sensitive element of the array detector, to allow to practically eliminate the impact of radiation source direction on local lead equivalent thickness measurements, thus removing the divergence limit of the X-ray beam, reducing the overall scanner size and making it more mobile. Note that the defectoscope is compact and closed, which conforms to the radiation safety requirements for personnel who run tests on X-ray protective clothing and materials.

Test object scanning algorithm:

Step 1. The test object is placed on a mount and the conveyor belt moves it into the testing chamber. The scanner's testing chamber has a stationary radiation shield that maintains personnel safety, protecting people from direct exposure to radiation beams. X-rays are emitted only when the test object is passing through the scanning area. Under normal operating conditions, this configuration of the defectoscope reduces radiation exposure and received dose at all points within 0.1 m from the outer surface of the scanner to 1.0 µSv/h or less. Thus, the received dose on scanner personnel workstations does not exceed 1.0 µSv/h.

Step 2. The operator sets the nominal thickness value for the lead equivalent by selecting the needed value from the drop-down list in the pop-up window.

Figure 3:
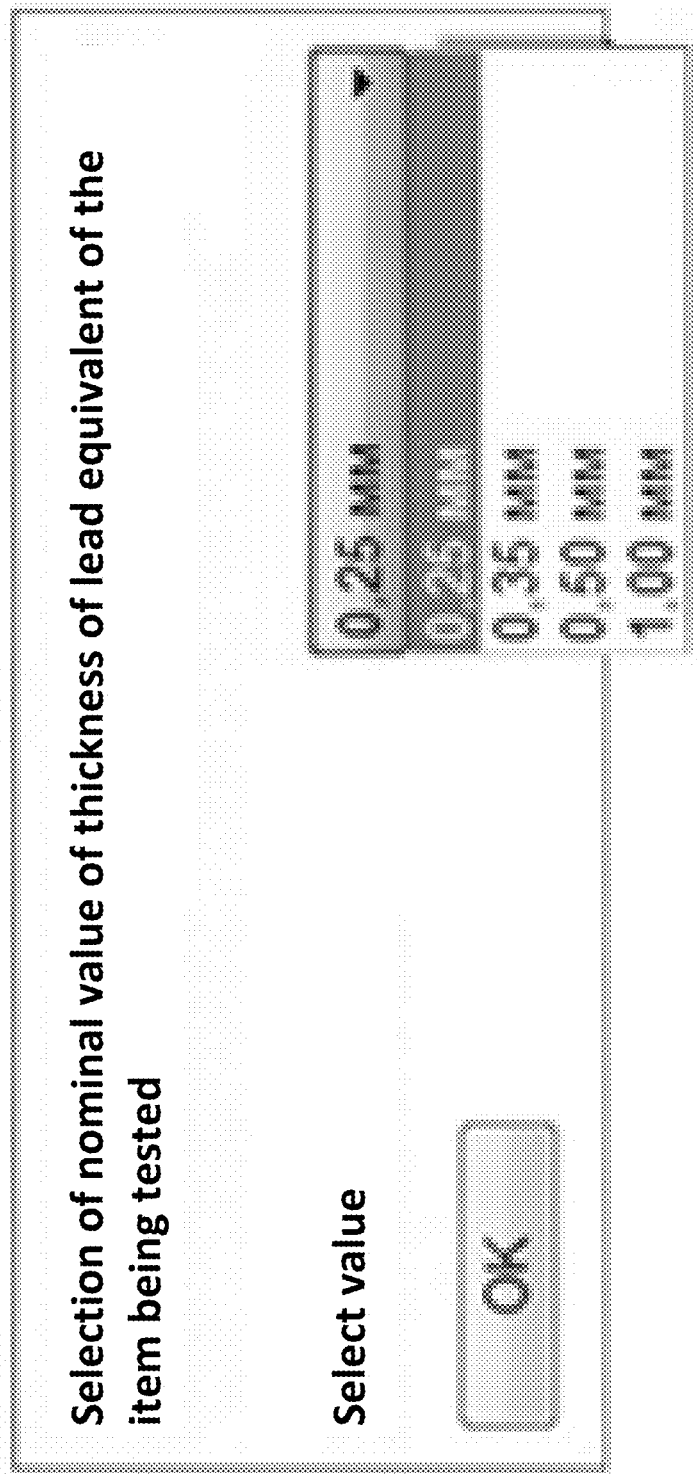
FIG. 3 shows lead equivalent nominal thickness selection window of the user interface.

FIG. 3 shows lead equivalent nominal thickness selection window of a user interface for an operator of the scanner.

The nominal thickness of the lead equivalent is set in accordance with the test object specifications.

Step 3. The operator starts the scanning procedure. The scanned images are rendered in real time in the working window of the program and displayed on the screen along the direction of the conveyor belt. The original image rendered is monochrome. After scanning, the final image is automatically scaled to fit into the viewing area.

Step 4. The automatic defect detection algorithm sets different colors for the image pixels depending on lead equivalent thickness measurements. Processing the final X-ray image, the algorithm selects an area of interest that is then subdivided into separate windows of 10×10 pixels, corresponding to test object surface areas of up to 15×15 mm, for further analysis. The algorithm calculates the arithmetic mean of the lead equivalent for the entire area of interest and for each window, determining the window with the least thickness of the lead equivalent (a critical area). Based on the calculations, the algorithm also determines the values of relative heterogeneity of the protective material and of standard uncertainty.

By processing the final X-ray image of the test object, the software algorithm for automatic defect detection does the following:

Step 4.1. The coloring of the image pixels displayed for the operator depends on lead equivalent thickness measurements in different areas of the test object:

| Pixel color | Value |
| --- | --- |
| Green | The actual thickness of the material equals or exceeds the set lead equivalent thickness. The green-colored areas provide sufficient protection. The thicker the lead equivalent is, the more vivid is the color. |
| Yellow | The thickness of the material is less than the set lead equivalent thickness by up to 10%. Such yellow-colored areas provide satisfactory protection. |

-continued

| Pixel color | Value |
|---|---|
| Pink-tinted to red-tinted | The thickness of the material is less than the set lead equivalent thickness by more than 10%. Such areas provide inadequate protection compared with the requirements. |

Step 4.2. The defective areas, where the material thickness is less than the set lead equivalent thickness by 10% or more, are highlighted. The defective areas are outlined in red. The area having the least lead equivalent thickness is also highlighted in blue.

Figure 4:
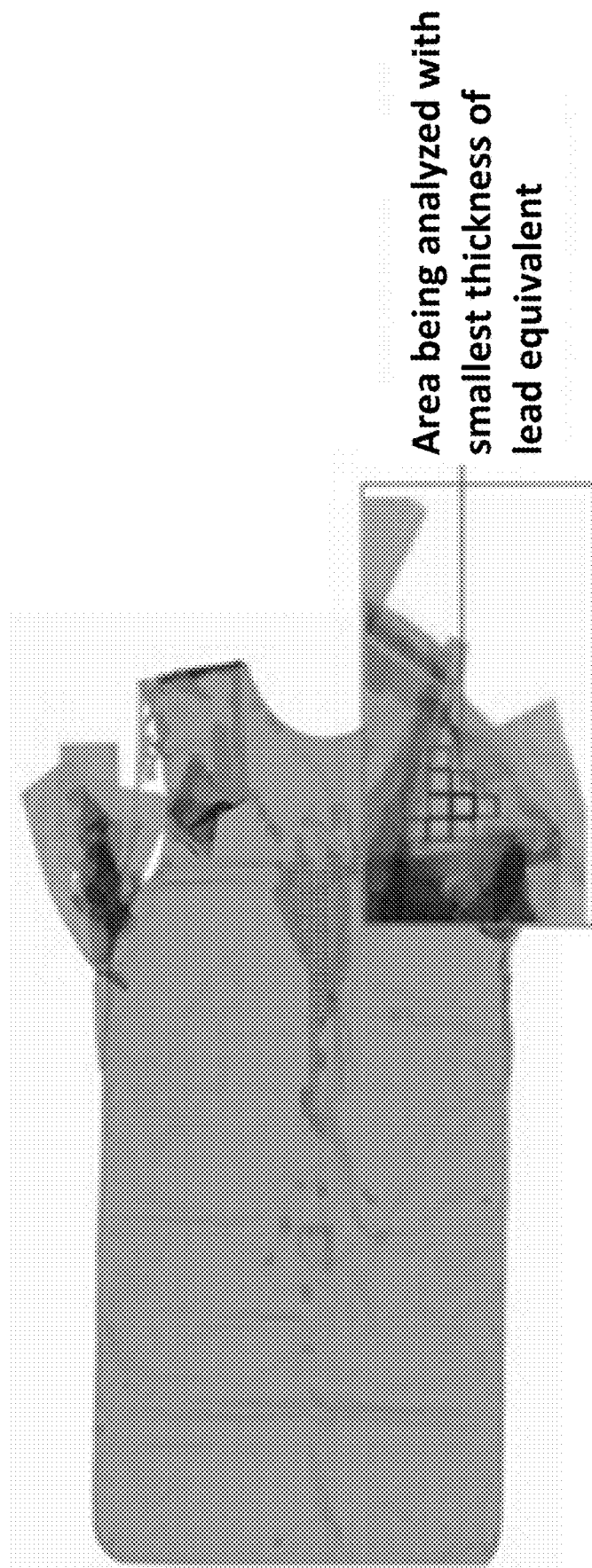
FIG. 4 shows an example of an image with defective areas.
Figure 5:
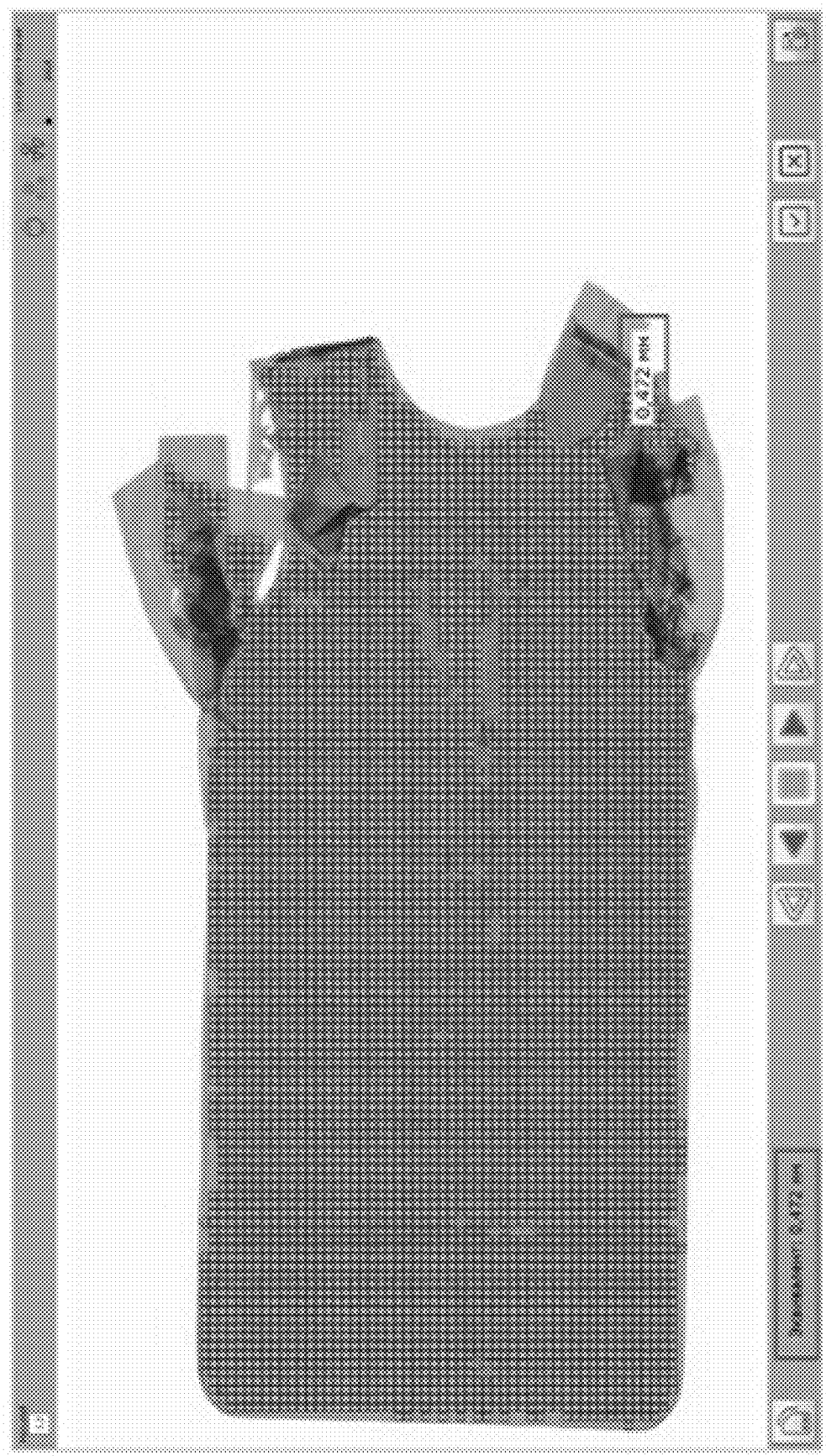
FIG. 5 shows lead equivalent calculated thickness indication.

FIG. 4 shows an image showing defective areas. By hovering the mouse cursor over the defective areas that have been highlighted by the algorithm, it is possible to see their actual lead equivalent thickness values. These values are also printed in the functional panel in the working window of the program. FIG. 5 shows the lead equivalent calculated thickness indication Step 4.3. The following values are automatically calculated:
lead equivalent attenuation in critical areas;
arithmetic mean of the lead equivalent attenuation;
relative heterogeneity of the protective material;
standard calculation uncertainty.

Step 5. The calculated values are automatically included into the report along with the corresponding images, and are used by the operator to decide whether the test object can be used or not.

Figure 6:
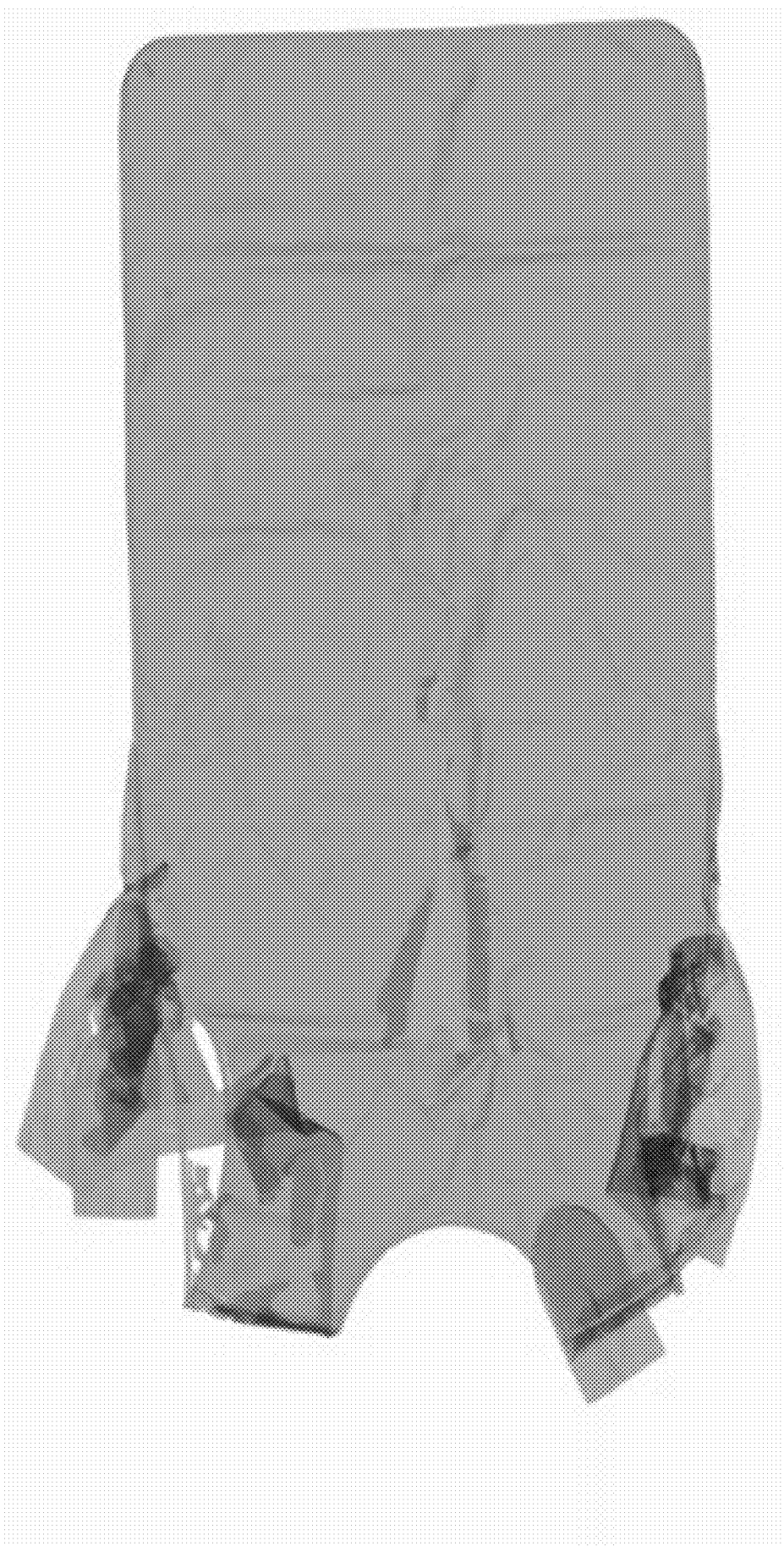
FIG. 6 shows a computer-processed scan of an X-ray protective apron.

FIG. 6 shows a computer-processed scan of an X-ray protective apron. The tree colors correspond to the three thickness volumes of the lead equivalent.

By thoroughly examining the entire surface of the test protective clothing, it is possible to 100% reliably detect all major defects and damages that put the personnel under the risk of radiation exposure. For instance, protective aprons with the lead equivalent of 0.35 or 0.50 mm reduce the received dose 100 or 300 times respectively [3]. However, if a portion of the apron's surface is damaged, it may cause a significant increase of the received dose. The proposed defectoscope is capable of rendering even the smallest defects in the protective coating, as well as larger ones.

Testing of X-ray protection material properties

To demonstrate the capabilities of the proposed defectoscope in the measuring of lead equivalent, there was a series of measurements run on test plates of varying thicknesses (d, listed in the left-hand column of Table 1). Calibration functions for each element in the array detector were calculated based on intensity measurements of the radiation penetrating the stages of the lead calibration wedge (0.3 mm; 0.5 mm; 1 mm) [8]. The relation between the lead absorber thickness and radiation intensity was approximated with a quadratic function [7] that had been used to measure lead equivalents of test plates, at X-ray source voltages of 80 kW and 100 kW [8]. The table below shows percentile deviations Aso, A100 of mean lead equivalent values from known test plate thicknesses across five measurements.

TABLE 1

| Lead equivalent measurement deviations from test plate thickness | | |
|---|---|---|
| d, mm | $\Delta_{80}$, % | $\Delta_{100}$, % |
| 0.34 | 4.59 | 3.18 |
| 0.51 | 2.12 | 2.67 |
| 0.85 | 0.99 | 1.25 |
| 1.02 | −3.25 | −1.92 |
| 1.19 | −2.86 | −0.32 |

Hence, lead equivalent measurement in widely used protective clothing with d≤1 mm has the margin of error of less than 5%. The test results confirm that it is possible to use array detectors instead of ionization chambers for determining of lead equivalents in lead-based X-ray protective materials.

By using solid-body array detectors, the proposed defectoscope provides a novel approach to solving of the issues related to the testing of properties of X-ray protective materials. For instance, vast amounts of data on absorption properties of materials that can be obtained by means of the proposed defectoscope, along with mathematical processing, allow to dramatically enhance the method for determining the homogeneity of the properties. According to both the GOST standard 31114.1-2002 [1] and International standard [2], the homogeneity value is conventionally determined based on the results of 5-10 measurements made on characteristic or successive areas of the material. The results are used to calculate the maximum deviation from the mean value. At the same time, the necessity of using a narrow beam (less than 10 mm) contradicts the requirement of full coverage of the sensitive detector area with the radiation beam [1]. The proposed defectoscope is capable of dramatically improving this procedure in a number of aspects, all based on a single scanning of the test object. Also, since scanning provides data on the object's absorbtion properties for each point, 1. the limit on the number of areas used in calculations may be lifted, while those areas may "cover" any surface for scanning, even the entire surface of the test object;

2. heterogeneity parameters may be calculated for areas of varying sizes and shapes;

3. areas with obvious defects of protective coating can be easily skipped to obtain even more precise heterogeneity values.

In order to further refine information on heterogeneity in small scales of the defectoscope structure, the linear detector may be positioned next to the test sample.

In order to understand fundamental issues and advantages of solid-body array detectors, we have to refer to difficulties in the implementation of conventional testing methods that arise from wider use of X-ray protective materials with smaller lead content that are characterized by significantly higher radiation dose factors than pure lead [4, 5]. In accordance with the GOST standard 31114.1-2002 [1] and International standard [2], X-ray protective materials are tested using narrow-beam and broad-beam geometries (see FIGS. 7A, 7B). Narrow-beam geometry is necessary for measuring the attenuation coefficient of permeating radiation, since scattered radiation is practically not registered by the detector.

At the same time, scattered radiation also contributes to the dose uptake of shielded objects, so it has to be taken into account when determining absoprtion properties of protective materials. That is why it is also necessary to use broad-beam geometry (see FIG. 7B). However, radiation intensity measurement encounters a number of difficulties in this way as well. Largely, these difficulties are related to the use of ionization chambers that are mostly designed to measure kermas. Specifically, when spherical ionization chambers are used, the test sample must be a dozen times larger that their radii [1, 2]. Also, the beam targeting the test sample has to have a limited angular divergence, it is necessary to put the source at a considerable distance from the object (1.5 m, according to [1]).

Figure 7A:
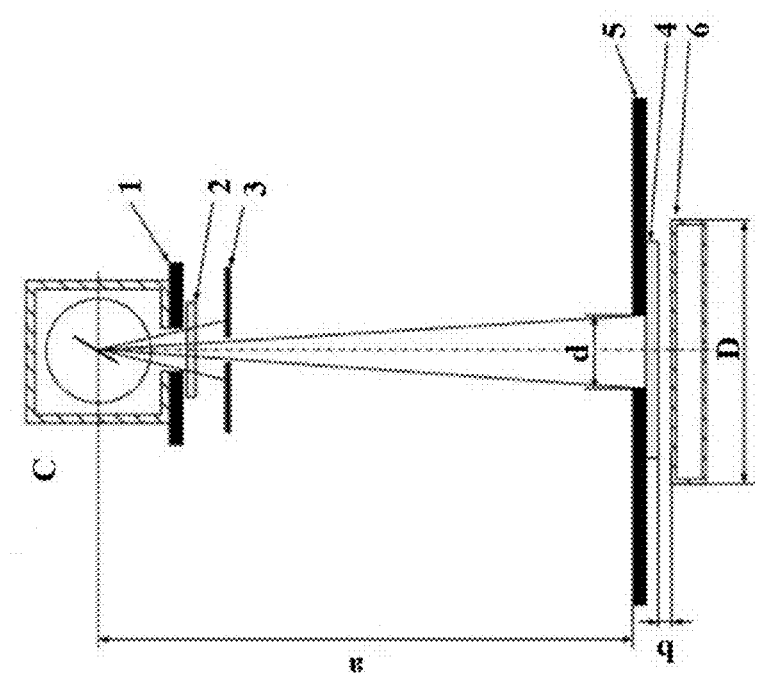
FIG. 7A shows narrow-beam geometry of a scanner.
Figure 7B:
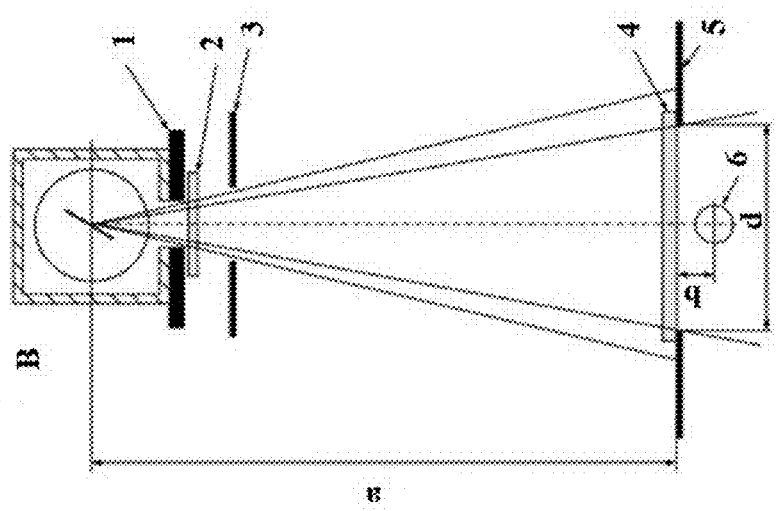
FIG. 7B shows broad-beam geometry.
Figure 7C:
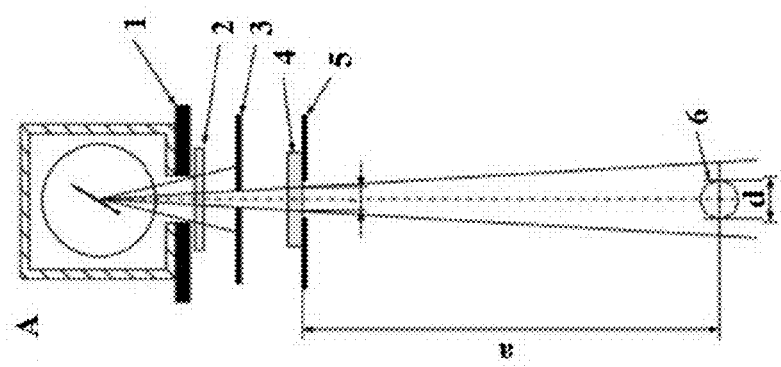
FIG. 7C shows inverse broad-beam geometry.

FIG. 7A shows narrow-beam geometry, FIG. 7B shows broad-beam geometry, FIG. 7C shows inverse broad-beam geometry. 1, 3, 5 are diaphragms, 2 is a filter, 6 is a detector.

These difficulties have been deemed quite essential, as the International standard [2] invites to replace broad-beam geometry with inverse broad-beam geometry (see FIG. 7C), where the object is radiographed with a narrow beam, while the permeating radiation is registered by a flat ionization chamber, which is significantly larger that the diaphragm that confines the beam targeting the object. Like broad-beam geometry (see FIG. 7B), inverse broad-beam geometry (see FIG. 7C) allows to register scattered radiation and thus can be included into the current International standard [2]. Although this allows to avoid issues related to the size of the beam and its angular divergence, it turned out that partial irradiation of flat ionization chambers (which actually isn't stipulated by their operating conditions) results in vastly diverse measurements, depending on camera model [4]. This prompted a corrective procedure to be developed—a modified inverse broad-beam geometry [4], which, in turn, prompted a simplified version—a modified broad-beam geometry [5].

Scanning and image processing procedures used in the proposed defectoscope, based on array detectors, allow to avoid serious issues caused by ionization chambers. Specifically, when array detectors are used, there is no issues related to the dependence of detector response from irradiated area size. Besides, by taking into account the radiation source direction in each point of the detector when processing signals during calibration and measurement, it is possible to eliminate the low divergence requirement and its impact on measurements themselves. It is also possible to use a very broad fan beam that allows to scan considerable surface areas while keeping the scanner reasonably compact and mobile.

Advantages of array detectors that are demonstrated by the proposed defectoscope, its configuration and functions, make the case for developing of a new standard for testing of protective material properties. High-density scintillation materials in array detectors absorb the major part of the hardest radiation, which makes them more fit to examine absorption properties of materials with high atomic numbers. On the other hand, there is ever wider usage of lead-less protective materials that generate much more scattered radiation than pure lead, necessitates obtaining of information of softer radiation (25-35 keV [5]). This obstacle can be overcome with dual-energy array detectors that allow to register hard and soft radiation by means of different scintillator layers separated by an absorbing filter.

In addition, dual-energy array detectors enable a novel solution to the difficult issue of describing of X-ray source radiation quality that is further complicated by expanded use of lead-less protective materials. While the radiation quality is an integral part of the GOST [1] and International [2] standards, their approaches to the issue differ significantly. For instance, the International Standard [2] uses half-value layer thicknesses for different source voltages, along with source voltage, filter material and thickness, that are listed in the GOST standard [1] as well. The experiment actually demonstrates that half-value layer thicknesses may differ for sources that have similar voltages and filter values, but different anode angles and output window thicknesses [4]. Thus, the GOST standard [1] that describes radiation quality only through source voltage and filter characteristics does not take into account the differences of various sources that may further add to errors in lead equivalent determination. It seems that the GOST standard [1] does not use half-value layers because they require complex measurements. The current "gap" between radiation quality definitions in the International Standard [2] and GOST standard [1] can be bridged to some extent through use of dual-energy array detectors that form an integral part of the proposed defectoscope. At the same time, the differences of sources having similar voltages and filters (specifically, the differences in the integral intensity ratio between the soft and hard parts of the X-ray spectrum) may be quantified with a dual-energy detector while running regular calibration measurements both with templates and without them.

Figure 8:
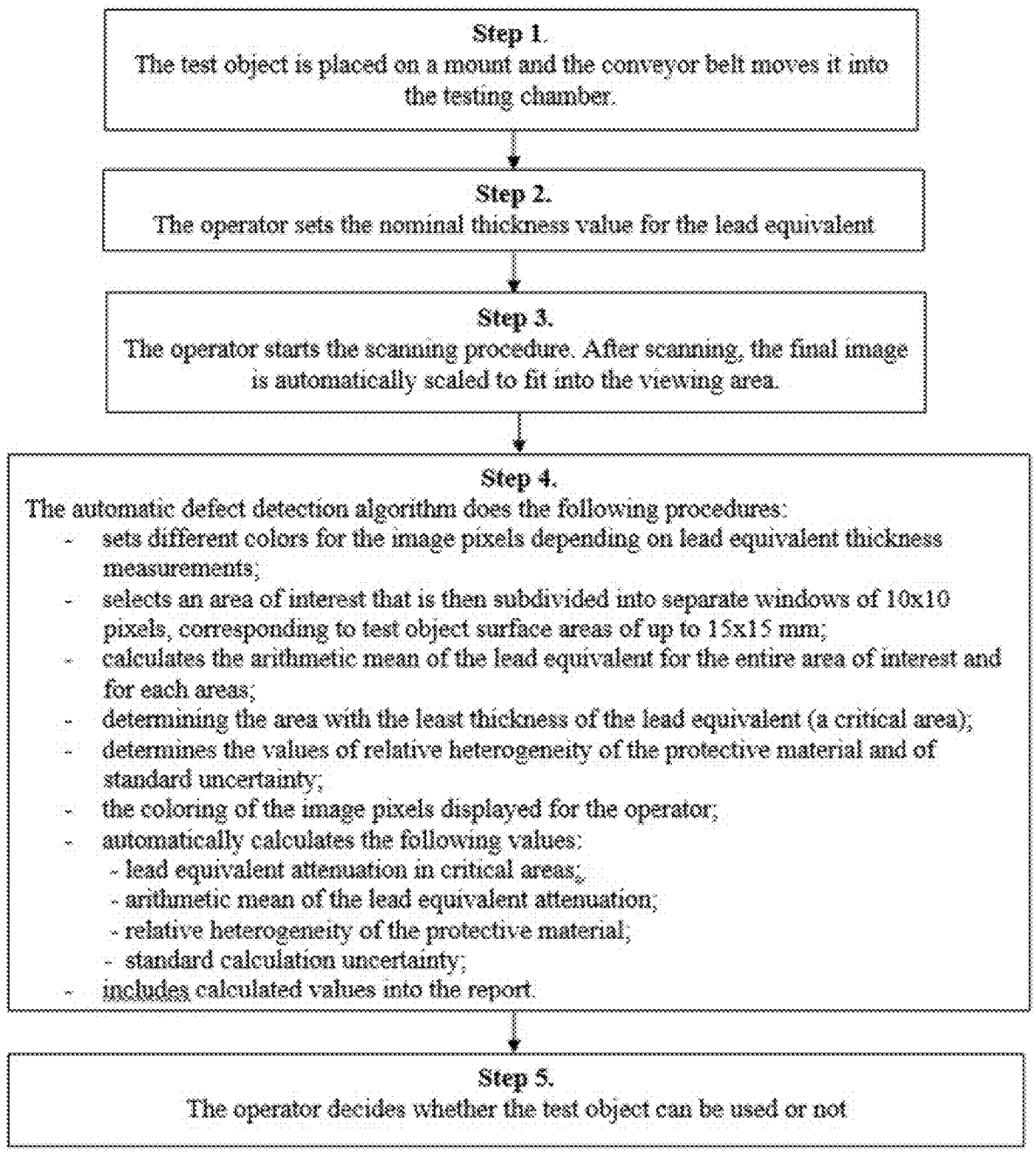
FIG. 8 shows a flow chart of the algorithm for identifying defective protective clothing.

FIG. 8 shows a flow chart of the algorithm for identifying defective protective clothing.

In step 1, the test object is placed on a mount and the conveyor belt moves it into the testing chamber. In step 2, the operator sets the nominal thickness value for the lead equivalent. In step 3, the operator starts the scanning procedure. After scanning, the final image is automatically scaled to fit into the viewing area. In step 4, the automatic defect detection algorithm performs the following procedures:
  sets different colors for the image pixels depending on lead equivalent thickness measurements;
  selects an area of interest that is then subdivided into separate windows of 10×10 pixels, corresponding to test object surface areas of up to 15×15 mm;
  calculates the arithmetic mean of the lead equivalent for the entire area of interest and for each areas;
  determining the area with the least thickness of the lead equivalent (a critical area);
  determines the values of relative heterogeneity of the protective material and of standard uncertainty;
  the coloring of the image pixels displayed for the operator;
  automatically calculates the following values:
  lead equivalent attenuation in critical areas;
  arithmetic mean of the lead equivalent attenuation;
  relative heterogeneity of the protective material;
  standard calculation uncertainty;
  includes calculated values into a report.

In Step 5, the operator decides whether the test object can be used or not.

Conclusion

The proposed defectoscope provides for faster and more convenient scanning of vast object surfaces, 100% reliably detecting and thoroughly analyzing all major damages to the protective coating, but also rendering the tiniest cracks and areas with reduced lead equivalent thickness as well.

Calibration of and the object's lead equivalent thickness measurement by each individual X-ray-sensitive element of the array detector allow to practically eliminate the impact of radiation source direction on local lead equivalent thickness measurements, thus removing the divergence limit of the X-ray beam, reducing the appliance size and making it more mobile.

By scanning the entire surface of the object, it is possible to obtain exhaustive data on the heterogeneity of its protective coating and dramatically improve its characteristics.

Widely used linear array detectors allow to avoid many drawbacks associated with ionization chambers. For instance, it is no longer necessary to accommodate the size of the detector to that of the test sample and the distance from the source. It also eliminates the dependence between detector signals and the size of the exposed area.

Dual-energy linear array detectors open up new possibilities for simplified measurement and quality assessment of X-ray radiation sources. Besides, they allow to obtain additional data on the elemental composition of test objects that is of paramount importance when lead-less protective materials are tested.

The advantages of the proposed defectoscope listed above not only call for its wider use in the testing of protective clothing, but also pave the way for simpler and more informative versions of Russian GOST and International Standards of quality assessment for X-ray protective materials.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

REFERENCES

[1] Russian GOST standard 31114.1-2002, Protective devices against diagnostic medical X-radiation.—Part 1: Determination of attenuation properties of materials.
[2] International Standard IEC 61331-1:2014, Protective devices against diagnostic medical X-radiation≥Part 1: Determination of attenuation properties of materials (2014).
[3] V. I. Kuzin, Angiography: Radiation and hygienic characteristics of personnel working conditions. Sanitary and epidemiological inspection, 2009. Vol. 2, No. 1, pp. 52-58.
[4] L. Buermann Determination of lead equivalent values according to IEC 61331-1:2014—Report and short guidelines for testing laboratories dx.doi.org/10.1088/1748-0221/11/09/T09002. 2016 JINST 11 T09002.
[5] Heinrich Eder and Helmut Schlattl. IEC 61331-1: A new setup for testing lead free X-ray protective clothing 2018 Physica Medica 45 6.
[6] Operator's manual ADN145.00.00.000-FLOWD 8020 X-ray defectoscope, 2017. 75 p.
[7] Operator's manual ADN145.76.00.000 34 "DefVision control program complex".
[8] FLOWD 8020 X-ray defectoscope certification protocol No. 485900/1. Belarusian State Institute of Metrology, 2017.
[10] Russian GOST standard 31114.1-2002 (IEC 61331-3: 1998), Protective devices against diagnostic medical X-radiation. Part 3: Protective clothing.

What is claimed is:

1. A method of detecting defects in protective clothing items, the method comprising:
   positioning a protective clothing item in a scanner;
   moving the item through scanner while irradiating the item with X-rays;
   measuring energy of the X-rays that pass through the item using a linear detector as the item is being moved through the scanner;
   automatically calculating a lead equivalent thickness of each pixel of the item based on the measured energy;
   automatically identifying any rectangular areas of the item with defects and
   displaying an image of the item for an operator with the identified areas highlighted in color.

2. The method of claim 1, wherein a conveyor belt with convertible rollers and clamping drums is used to move the item.

3. The method of claim 1, wherein shades of green, yellow and red are used to indicate different lead equivalent thickness on the image.

4. The method of claim 1, further comprising dividing the image within boundaries of the protective clothing item into separate windows of 10×10 pixels, corresponding to areas of up to 15x15 mm.

5. The method of claim 4, further comprising calculating an arithmetic mean of the lead equivalent thickness for an entire area item and for each area, based on a calibration that uses lead wedges.

6. The method of claim 1, further comprising determining an area with the least lead equivalent thickness and identifying the area with the least lead equivalent thickness for the operator.

7. The method of claim 1, further comprising automatically determining values of relative heterogeneity of the detection area of the protective clothing item.

8. The method of claim 1, further comprising calculating the following values by performing, in sequence, the steps of:
   lead equivalent attenuation in critical areas;
   arithmetic mean of the lead equivalent attenuation;
   relative heterogeneity of the protective material; and
   deviation of the lead equivalent thickness of the entire item from a nominal value.

9. The method of claim 1, further comprising automatic detection of the boundaries of the protective clothing item.

10. The method of claim 1, further comprising automatic determination of the analysis area within the boundaries of the protective clothing item with automatic dividing the analysis area into rectangular areas.

11. The method of claim 1, wherein, prior to the positioning step, the linear detector is calibrated by using a two-stage or three-stage calibration wedge with lead stages.

* * * * *